US011824985B2

(12) United States Patent
Ali et al.

(10) Patent No.: US 11,824,985 B2
(45) Date of Patent: Nov. 21, 2023

(54) BLOCKCHAIN-BASED HYBRID AUTHENTICATION

(71) Applicant: SKYGRID, LLC, Austin, TX (US)

(72) Inventors: Syed Mohammad Ali, Leander, TX (US); Lowell L. Duke, Austin, TX (US); Zehra Akbar, Leander, TX (US); Syed Mohammad Amir Husain, Georgetown, TX (US); Taylor R. Schmidt, Austin, TX (US)

(73) Assignee: SKYGRID, LLC, Austin, TX (US)

( * ) Notice: Subject to any disclaimer, the term of this patent is extended or adjusted under 35 U.S.C. 154(b) by 75 days.

(21) Appl. No.: 17/217,691

(22) Filed: Mar. 30, 2021

(65) Prior Publication Data

US 2021/0306152 A1    Sep. 30, 2021

Related U.S. Application Data

(60) Provisional application No. 63/002,543, filed on Mar. 31, 2020.

(51) Int. Cl.
*H04L 9/30* (2006.01)
*H04L 9/08* (2006.01)

(52) U.S. Cl.
CPC .............. *H04L 9/30* (2013.01); *H04L 9/088* (2013.01)

(58) Field of Classification Search
CPC .................................. H04L 9/30; H04L 9/088
See application file for complete search history.

(56) References Cited

U.S. PATENT DOCUMENTS

| 10,515,555 | B2 * | 12/2019 | High ................... G08G 5/0021 |
| 10,547,454 | B2 * | 1/2020 | Beaman ................. H04L 9/50 |
| 11,079,757 | B1 * | 8/2021 | Duksta ................ G05D 1/0088 |
| 11,222,292 | B2 * | 1/2022 | Yu ..................... G06Q 10/0637 |
| 11,279,481 | B2 * | 3/2022 | Burks .................. H04W 12/03 |
| 11,436,930 | B2 * | 9/2022 | Ali ....................... G08G 5/0069 |
| 2017/0094446 | A1 * | 3/2017 | Maggiore ............. H04W 4/80 |
| 2018/0072265 | A1 * | 3/2018 | Samadani ............. G06F 21/00 |
| 2018/0270244 | A1 * | 9/2018 | Kumar ................. B64C 39/024 |
| 2019/0199534 | A1 * | 6/2019 | Beaman ................. B64D 1/00 |
| 2019/0278897 | A1 * | 9/2019 | Zhang .................. G06F 21/604 |
| 2020/0364456 | A1 * | 11/2020 | Tran ..................... B64C 39/024 |
| 2021/0201326 | A1 * | 7/2021 | Ambikapathi ..... G06Q 20/4014 |

OTHER PUBLICATIONS

International Search Report and Written Opinion, PCT/US2021/024908, dated Jun. 29, 2021, 9 pages.

* cited by examiner

*Primary Examiner* — Yonas A Bayou

(57) ABSTRACT

In a particular embodiment, blockchain-based hybrid authentication is disclosed that includes receiving, by a smart contract controller, an invocation of a smart contract and accessing, by the smart contract controller, one or more parameters associated with a client account. In this embodiment, the smart contract determines whether the one or more parameters fulfill the smart contract. In response to determining that the one or more parameters fulfill the smart contract, the smart contract provides an attestation of an identity associated with the client account.

17 Claims, 12 Drawing Sheets

BLOCKCHAIN-BASED HYBRID AUTHENTICATION

CROSS-REFERENCE TO RELATED APPLICATION

This application is a non-provisional application for patent entitled to a filing date and claiming the benefit of earlier-filed U.S. Provisional Patent Application Ser. No. 63/002,543, filed Mar. 31, 2020.

BACKGROUND

Conventional authentications mechanisms for user accounts often utilize a shared secret such as a username and a password, in which a hash of the password is stored in a centralized database on a server of the account provider. Even though the hash is stored, the server still sees the plain text password. Other types of authentication mechanisms may use public/private key pairs, where either the account provider stores the public/key pair for the user in a repository, or the user retains possession of the key pair. The former scenario increases the liability of the account provider in the event of a breach or hack of the provider's server, and the latter scenario increases the risk that the user will lose their authentication information without any way to recover the account information from the account provider. Therefore, it would be advantageous to provide an authentication system that ensures the integrity of data in the account provider's system while allowing the user to recover their account in the event of lost authentication information.

SUMMARY

In a particular embodiment, a method of blockchain-based hybrid authentication is disclosed that includes accessing, by a smart contract controller executing on a device of a UAV transportation ecosystem, one or more parameters associated with a UAV. In this embodiment, the smart contract determines whether the one or more parameters satisfies one or more conditions for fulfillment of the smart contract. In response to determining that the one or more parameters satisfies the one or more conditions for fulfillment of the smart contract, the smart contract indicates a requirement for the UAV to receive a service operation.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
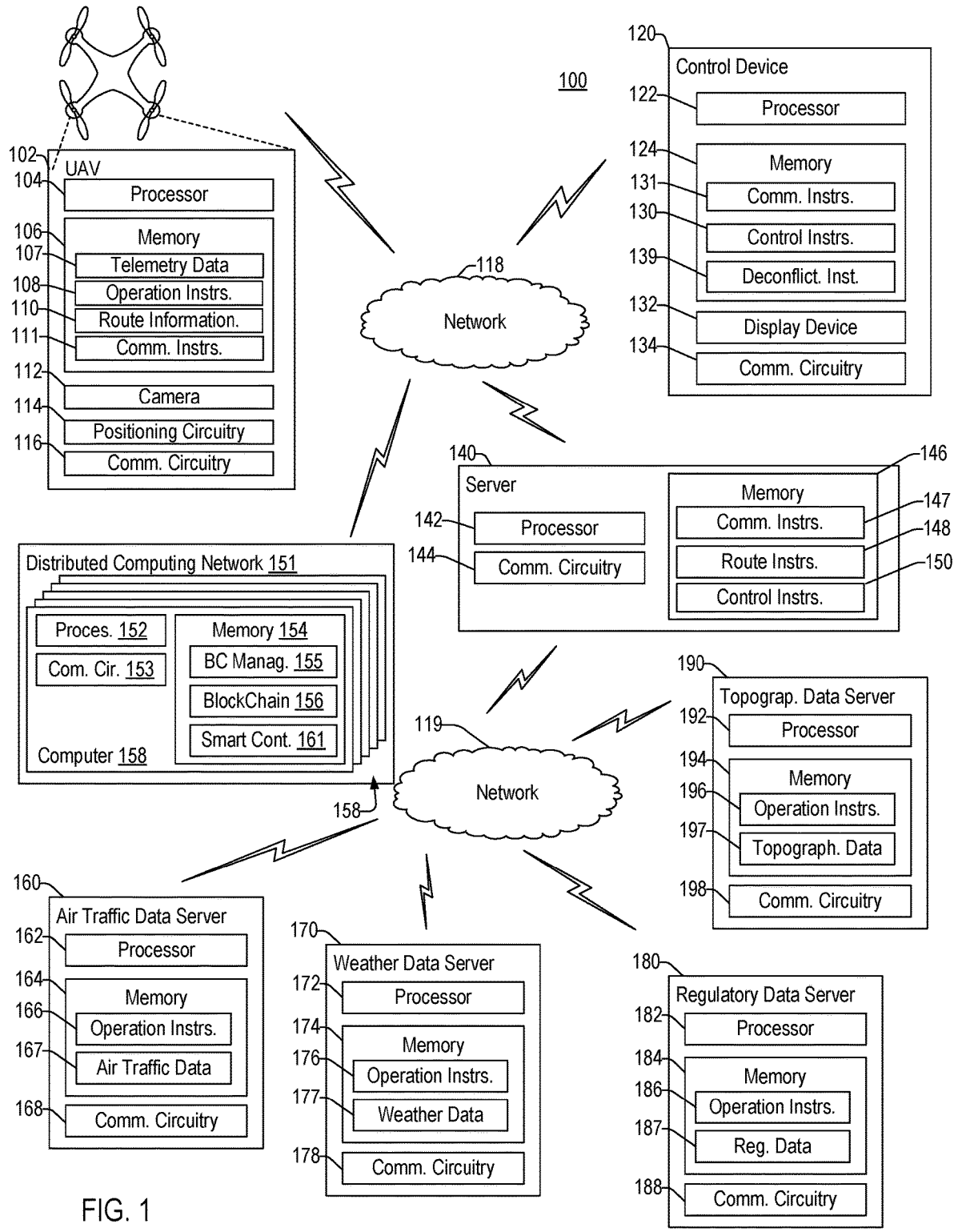
FIG. 1 is a block diagram illustrating a particular implementation of a system for blockchain-based hybrid authentication.

Particular aspects of the present disclosure are described below with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

Embodiments in accordance with the present invention are directed to providing a hybrid authentication approach which allows users to interact with the account provider systems using a traditional username/password interface in which the user retains possession of a public/private key pair (i.e., the account provider does not possess the private key of the user). When account recovery is necessitated (e.g., lost password), a smart contract for changing authentication information allows the user to associate their account with a new key pair by verifying ownership of the account. Ownership of the account may be verified using a blockchain data structure associated with the user and upon which the smart contract signed by the user executes. Accordingly, the actions taken by the account provider in allowing the user to associate the new authentication information with the account is auditable, for example, by regulators.

For example, a user device may indicate to a provider server that a new public/private key pair should be associated with the user account or may otherwise instruct the server to watch for a code word that verifies the user's identity. The user device may provide the server with public key and plain text data. The user device then transmits a hash of the plaintext data using the new private key to a blockchain data structure associated with the user. The server looks for the hash of the plaintext data on the blockchain data structure associated with the user, which it may decode with the public key provided to the server from the user device. The server may then rely on the public key as authentic because the user is already associated with the blockchain data structure. The entire record of the exchange is logged in the blockchain data structure for verification by, for example, a regulatory auditor.

A particular environment where regulatory audits may be implemented to ensure the safe handling of a user account is banking or trading. Another such environment is in an unmanned aerial vehicle transportation ecosystem. An Unmanned Aerial Vehicle (UAV) is a term used to describe an aircraft with no pilot on-board the aircraft. The use of UAVs is growing in an unprecedented rate, and it is envisioned that UAVs will become commonly used for package delivery and passenger air taxis. However, as UAVs become more prevalent in the airspace, there is a need to regulate the operation of the UAVs and ensure the integrity of data systems governing facilitating their operation. Thus, a specific nonlimiting example where embodiments in accordance with the present invention may be utilized is with respect to user accounts for operating a UAV in the UAV transportation ecosystem. It is important the account provider make best efforts to guarantee that a user account, which may be used to control a UAV, is not misappropriated.

Exemplary methods, apparatuses, and computer program products for accessing data regarding a UAV in accordance with the present invention are described with reference to the accompanying drawings, beginning with FIG. 1. FIG. 1 sets forth a diagram of a system (100) configured for blockchain-based hybrid authentication according to embodiments of the present disclosure. The system (100) of FIG. 1 includes an unmanned aerial vehicle (UAV) (102), a control device (120), a server (140), a distributed computing network (151), an air traffic data server (160), a weather data server (170), a regulatory data server (180), and a topographical data server (190).

A UAV, commonly known as a drone, is a type of powered aerial vehicle that does not carry a human operator and uses aerodynamic forces to provide vehicle lift. UAVs are a component of an unmanned aircraft system (UAS), which typically include at least a UAV, a control device, and a system of communications between the two. The flight of a UAV may operate with various levels of autonomy including under remote control by a human operator or autonomously by onboard or ground computers. Although a UAV may not include a human operator pilot, some UAVs, such as passenger drones (drone taxi, flying taxi, or pilotless helicopter) carry human passengers.

For ease of illustration, the UAV (102) is illustrated as one type of drone. However, any type of UAV may be used in accordance with embodiments of the present disclosure and unless otherwise noted, any reference to a UAV in this application is meant to encompass all types of UAVs. Readers of skill in the art will realize that the type of drone that is selected for a particular mission or excursion may depend on many factors, including but not limited to the type of payload that the UAV is required to carry, the distance that the UAV must travel to complete its assignment, and the types of terrain and obstacles that are anticipated during the assignment.

In FIG. 1, the UAV (102) includes a processor (104) coupled to a memory (106), a camera (112), positioning circuitry (114), and communication circuitry (116). The communication circuitry (116) includes a transmitter and a receiver or a combination thereof (e.g., a transceiver). In a particular implementation, the communication circuitry (116) (or the processor (104)) is configured to encrypt outgoing message(s) using a private key associated with the UAV (102) and to decrypt incoming message(s) using a public key of a device (e.g., the control device (120) or the server (140)) that sent the incoming message(s). As will be explained further below, the outgoing and incoming messages may be transaction messages that include information associated with the UAV. Thus, in this implementation, communications between the UAV (102), the control device (120), and the server (140) are secure and trustworthy (e.g., authenticated).

The camera (112) is configured to capture image(s), video, or both, and can be used as part of a computer vision system. For example, the camera (112) may capture images or video and provide the video or images to a pilot of the UAV (102) to aid with navigation. Additionally, or alternatively, the camera (112) may be configured to capture images or video to be used by the processor (104) during performance of one or more operations, such as a landing operation, a takeoff operation, or object/collision avoidance, as non-limiting examples. Although a single camera (112) is shown in FIG. 1, in alternative implementations more and/or different sensors may be used (e.g., infrared, LIDAR, SONAR, etc.).

The positioning circuitry (114) is configured to determine a position of the UAV (102) before, during, and/or after flight. For example, the positioning circuitry (114) may include a global positioning system (GPS) interface or sensor that determines GPS coordinates of the UAV (102). The positioning circuitry (114) may also include gyroscope(s), accelerometer(s), pressure sensor(s), other sensors, or a combination thereof, that may be used to determine the position of the UAV (102).

The processor (104) is configured to execute instructions stored in and retrieved from the memory (106) to perform various operations. For example, the instructions include operation instructions (108) that include instructions or code that cause the UAV (102) to perform flight control operations. The flight control operations may include any operations associated with causing the UAV to fly from an origin to a destination. For example, the flight control operations may include operations to cause the UAV to fly along a designated route (e.g., based on route information (110), as further described herein), to perform operations based on control data received from one or more control devices, to take off, land, hover, change altitude, change pitch/yaw/roll angles, or any other flight-related operations. The UAV (102) may include one or more actuators, such as one or more flight control actuators, one or more thrust actuators, etc., and execution of the operation instructions (108) may cause the processor (104) to control the one or more actuators to perform the flight control operations. The one or more actuators may include one or more electrical actuators, one or more magnetic actuators, one or more hydraulic actuators, one or more pneumatic actuators, one or more other actuators, or a combination thereof.

The route information (110) may indicate a flight path for the UAV (102) to follow. For example, the route information (110) may specify a starting point (e.g., an origin) and an ending point (e.g., a destination) for the UAV (102). Additionally, the route information may also indicate a plurality of waypoints, zones, areas, regions between the starting point and the ending point.

The route information (110) may also indicate a corresponding set of control devices for various points, zones, regions, areas of the flight path. The indicated sets of control devices may be associated with a pilot (and optionally one or more backup pilots) assigned to have control over the UAV (102) while the UAV (102) is in each zone. The route information (110) may also indicate time periods during which the UAV is scheduled to be in each of the zones (and thus time periods assigned to each pilot or set of pilots).

In the example of FIG. 1, the memory (106) of the UAV (102) also includes communication instructions (111) that when executed by the processor (104) cause the processor (104) to transmit to the distributed computing network (151), transaction messages that include telemetry data (107). Telemetry data may include any information that could be useful to identifying the location of the UAV, the operating parameters of the UAV, or the status of the UAV. Examples of telemetry data include but are not limited to GPS coordinates, instrument readings (e.g., airspeed, altitude, altimeter, turn, heading, vertical speed, attitude, turn and slip), and operational readings (e.g., pressure gauge, fuel gauge, battery level).

The control device (120) includes a processor (122) coupled to a memory (124), a display device (132), and communication circuitry (134). The display device (132) may be a liquid crystal display (LCD) screen, a touch screen, another type of display device, or a combination thereof. The communication circuitry (134) includes a transmitter and a receiver or a combination thereof (e.g., a transceiver). In a particular implementation, the communication circuitry (134) (or the processor (122)) is configured to encrypt outgoing message(s) using a private key associated with the control device (120) and to decrypt incoming message(s) using a public key of a device (e.g., the UAV (102) or the server (140)) that sent the incoming message(s). Thus, in this implementation, communication between the UAV (102), the control device (120), and the server (140) are secure and trustworthy (e.g., authenticated).

The processor (122) is configured to execute instructions from the memory (124) to perform various operations. The instructions also include control instructions (130) that include instructions or code that cause the control device (120) to generate control data to transmit to the UAV (102) to enable the control device (120) to control one or more operations of the UAV (102) during a particular time period, as further described herein. The instructions also include deconfliction instructions (139) that include receiving flight path data for a first unmanned aerial vehicle (UAV), wherein the flight path data indicates a first flight path that traverses a geographic cell assigned to the deconfliction controller; determining, by a deconfliction module, whether the first flight path conflicts with at least one second flight path of at least one second UAV, wherein the at least one second flight path also traverses the geographic cell; and providing, in dependence upon the determination, first navigation instructions for one or more UAVs. The deconfliction instructions (139) are further configured for determining that the first flight path conflicts with the at least one of second flight path and providing, to at least one of the first UAV and the second UAV, rerouting instructions for a rerouted flight path that avoids the conflict. In some embodiments the first UAV and the at least one second UAV are coordinated by a server and the method further comprises transmitting one or more rerouted flight paths to a server. The deconfliction instructions (139) are further configured for receiving a flight path approval request and providing a flight path approval response to the first UAV.

In the example of FIG. 1, the memory (124) of the control device (102) also includes communication instructions (131) that when executed by the processor (122) cause the processor (122) to transmit to the distributed computing network (151), transaction messages that include control instructions (130) or deconfliction instructions (139) that are directed to the UAV (102). In a particular embodiment, the transaction messages are also transmitted to the UAV and the UAV takes action (e.g., adjusting flight operations), based on the information (e.g., control data) in the message.

The server (140) includes a processor (142) coupled to a memory (146), and communication circuitry (144). The communication circuitry (144) includes a transmitter and a receiver or a combination thereof (e.g., a transceiver). In a particular implementation, the communication circuitry (144) (or the processor (142)) is configured to encrypt outgoing message(s) using a private key associated with the server (140) and to decrypt incoming message(s) using a public key of a device (e.g., the UAV (102) or the control device (120)) that sent the incoming message(s). As will be explained further below, the outgoing and incoming messages may be transaction messages that include information associated with the UAV. Thus, in this implementation, communication between the UAV (102), the control device (120), and the server (140) are secure and trustworthy (e.g., authenticated).

The processor (142) is configured to execute instructions from the memory (146) to perform various operations. The instructions include route instructions (148) comprising computer program instructions for aggregating data from disparate data servers, virtualizing the data in a map, generating a cost model for paths traversed in the map, and autonomously selecting the optimal route for the UAV based on the cost model. For example, the route instructions (148) are configure to partition a map of a region into geographic cells, calculate a cost for each geographic cell, wherein the cost is a sum of a plurality of weighted factors, determine a plurality of flight paths for the UAV from a first location on the map to a second location on the map, wherein each flight path traverses a set of geographic cells, determine a cost for each flight path based on the total cost of the set of geographic cells traversed, and select, in dependence upon the total cost of each flight path, an optimal flight path from the plurality of flight paths. The route instructions (148) are further configured to obtain data from one or more data servers regarding one or more geographic cells, calculate, in dependence upon the received data, an updated cost for each geographic cell traversed by a current flight path, calculate a cost for each geographic cell traversed by at least one alternative flight path from the first location to the second location, determine that at least one alternative flight path has a total cost that is less than the total cost of the current flight path, and select a new optimal flight path from the at least one alternative flight paths. The route instructions (148) may also include instructions for storing the parameters of the selected optimal flight path as route information (110). For example, the route information may include waypoints marked by GPS coordinates, arrival times for waypoints, pilot assignments. The server (140) may be configured to transmit the route information (110) to the UAV (102).

The instructions may also include control instructions (150) that include instructions or code that cause the server (140) to generate control data to transmit to the UAV (102) to enable the server (140) to control one or more operations of the UAV (102) during a particular time period, as further described herein.

In the example of FIG. 1, the memory (146) of the server (140) also includes communication instructions (147) that when executed by the processor (142) cause the processor (142) to transmit to the distributed computing network (151), transaction messages that include control instructions (150) or route instructions (148) that are directed to the UAV (102).

The distributed computing network (151) of FIG. 1 includes a plurality of computers (157). An example computer (158) of the plurality of computers (157) is shown and includes a processor (152) coupled to a memory (154), and communication circuitry (153). The communication circuitry (153) includes a transmitter and a receiver or a combination thereof (e.g., a transceiver). In a particular implementation, the communication circuitry (153) (or the processor (152)) is configured to encrypt outgoing message(s) using a private key associated with the computer (158) and to decrypt incoming message(s) using a public key of a device (e.g., the UAV (102), the control device (120), or the server (140)) that sent the incoming message(s). As will be explained further below, the outgoing and incoming messages may be transaction messages that include information associated with the UAV. Thus, in this implementation, communication between the UAV (102), the control device (120), the server (140), and the distributed computing network (151) are secure and trustworthy (e.g., authenticated).

The processor (145) is configured to execute instructions from the memory (154) to perform various operations. The memory (154) includes a blockchain manager (155) that includes computer program instructions for recording data associated with the UAV (102). Specifically, the blockchain manager (155) includes computer program instructions that when executed by the processor (152) cause the processor (152) to receive a transaction message associated with a user account. For example, the blockchain manager may receive transaction messages from the UAV (102), the control device (120), or the server (140). As will be explained below, other entities (e.g., a user device) may transmit transaction messages associated with a client account to the blockchain manager (155). The blockchain manager (155) also includes computer program instructions that when executed by the processor (152) cause the processor (152) to use the information within the transaction message to create a block of data; and store the created block of data in a blockchain data structure (156) associated with the client account.

The blockchain manager may also include instructions for blockchain-based hybrid authentication. For example, the blockchain manager (155) also includes computer program instructions that when executed by the processor (152) cause the processor to receive an invocation of a smart contract; access one or more parameters associated with a client account; determine whether the one or more parameters fulfill the smart contract; and in response to determining that the one or more parameters fulfill the smart contract, indicate an attestation of an identity associated with the client account.

In the example of FIG. 1, the memory (154) includes a smart contract controller (161) that includes computer program instructions for determining whether to service the UAV (102). Specifically, the smart contract controller (161) includes computer program instructions that when executed by the processor (152) cause the processor (152) to access one or more parameters associated with a client account. In this embodiment, the smart contract controller (161) determines whether the one or more parameters satisfies one or more conditions for fulfillment of a smart contract. In response to determining that the one or more parameters satisfies the one or more conditions for fulfillment of the smart contract, the smart contract controller (161) indicates an attestation of an identity associated with the client account.

The UAV (102), the control device (120), and server (140) are communicatively coupled via a network (118). For example, the network (118) may include a satellite network or another type of network that enables wireless communication between the UAV (102), the control device (120), the server (140), and the distributed computing network (151). In an alternative implementation, the control device (120), the server (140) communicate with the UAV (102) via separate networks (e.g., separate short range networks.

In some situations, minimal (or no) manual control of the UAV (102) may be performed, and the UAV (102) may travel from the origin to the destination without incident. However, in some situations, one or more pilots may control the UAV (102) during a time period, such as to perform object avoidance or to compensate for an improper UAV operation. In some situations, the UAV (102) may be temporarily stopped, such as during an emergency condition, for recharging, for refueling, to avoid adverse weather conditions, responsive to one or more status indicators from the UAV (102), etc. In some implementations, due to the unscheduled stop, the route information (110) may be updated (e.g., via a subsequent blockchain entry, as further described herein) by route instructions (148) executing on the UAV (102), the control device (120), or the server (140)). The updated route information may include updated waypoints, updated time periods, and updated pilot assignments.

In a particular implementation, the route information is exchanged using a blockchain data structure. The blockchain data structure may be shared in a distributed manner across a plurality of devices of the system (100), such as the UAV (102), the control device (120), the server (140), and any other control devices or UAVs in the system (100). In a particular implementation, each of the devices of the system (100) stores an instance of the blockchain data structure in a local memory of the respective device. In other implementations, each of the devices of the system (100) stores a portion of the shared blockchain data structure and each portion is replicated across multiple of the devices of the system (100) in a manner that maintains security of the shared blockchain data structure as a public (i.e., available to other devices) and incorruptible (or tamper evident) ledger. Alternatively, as in FIG. 1, the blockchain (156) is stored in a distributed manner in the distributed computing network (151).

Figure 3A:
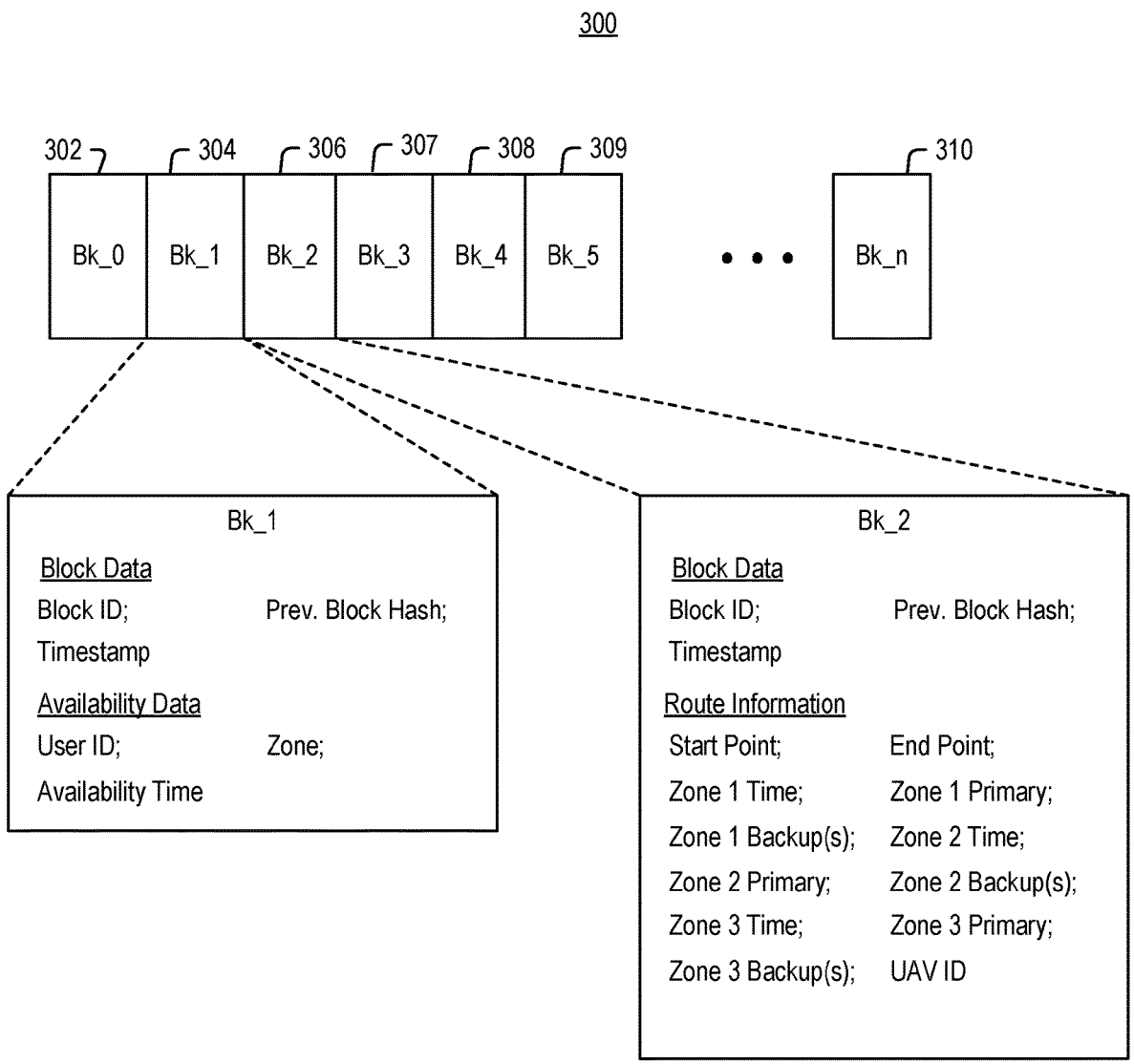
FIG. 3A a block diagram illustrating a particular implementation of the blockchain used by the systems of FIGS. 1-2 to record data associated with an unmanned aerial vehicle.
Figure 3B:
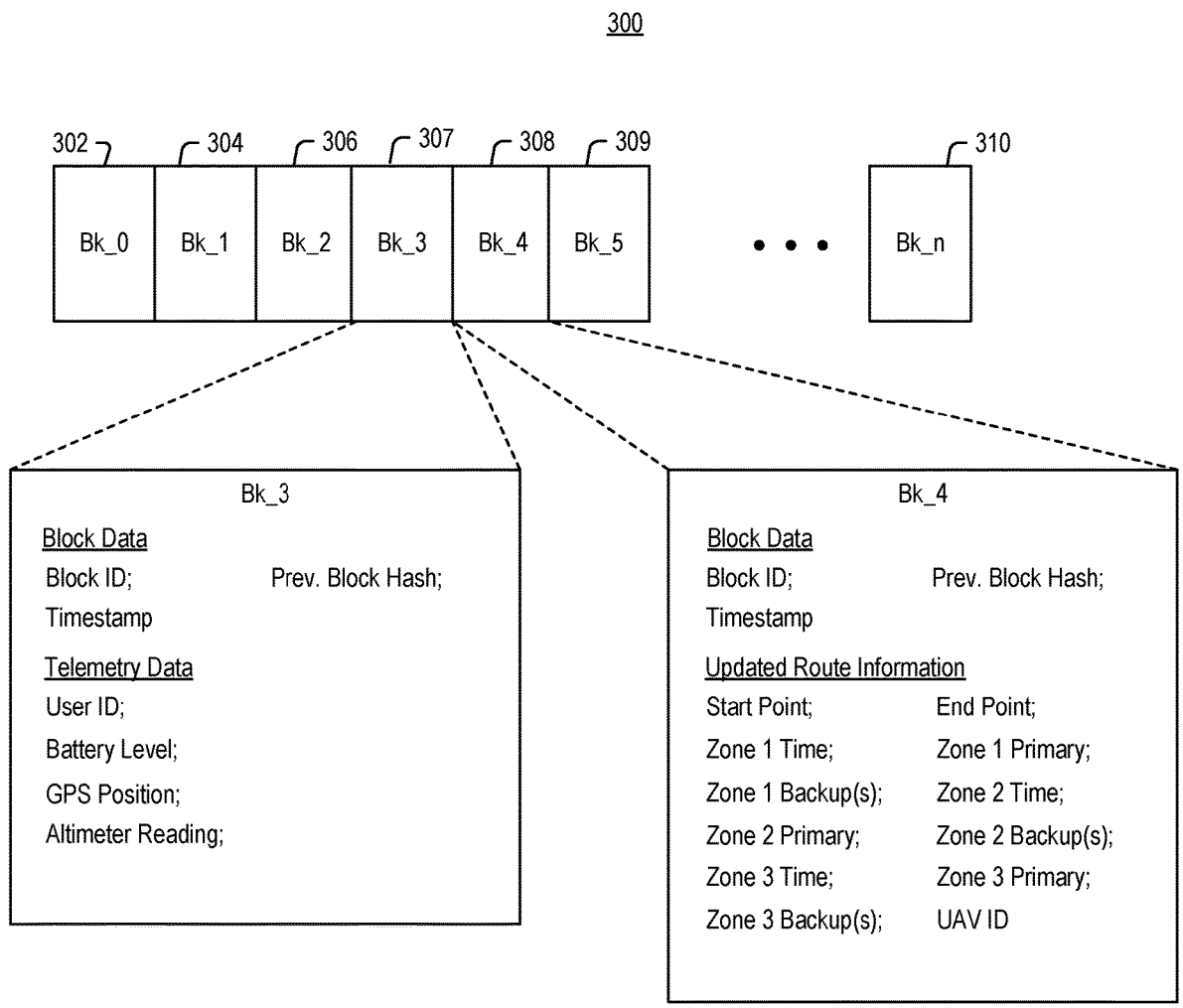
FIG. 3B is an additional view of the blockchain of FIG. 3A.
Figure 3C:
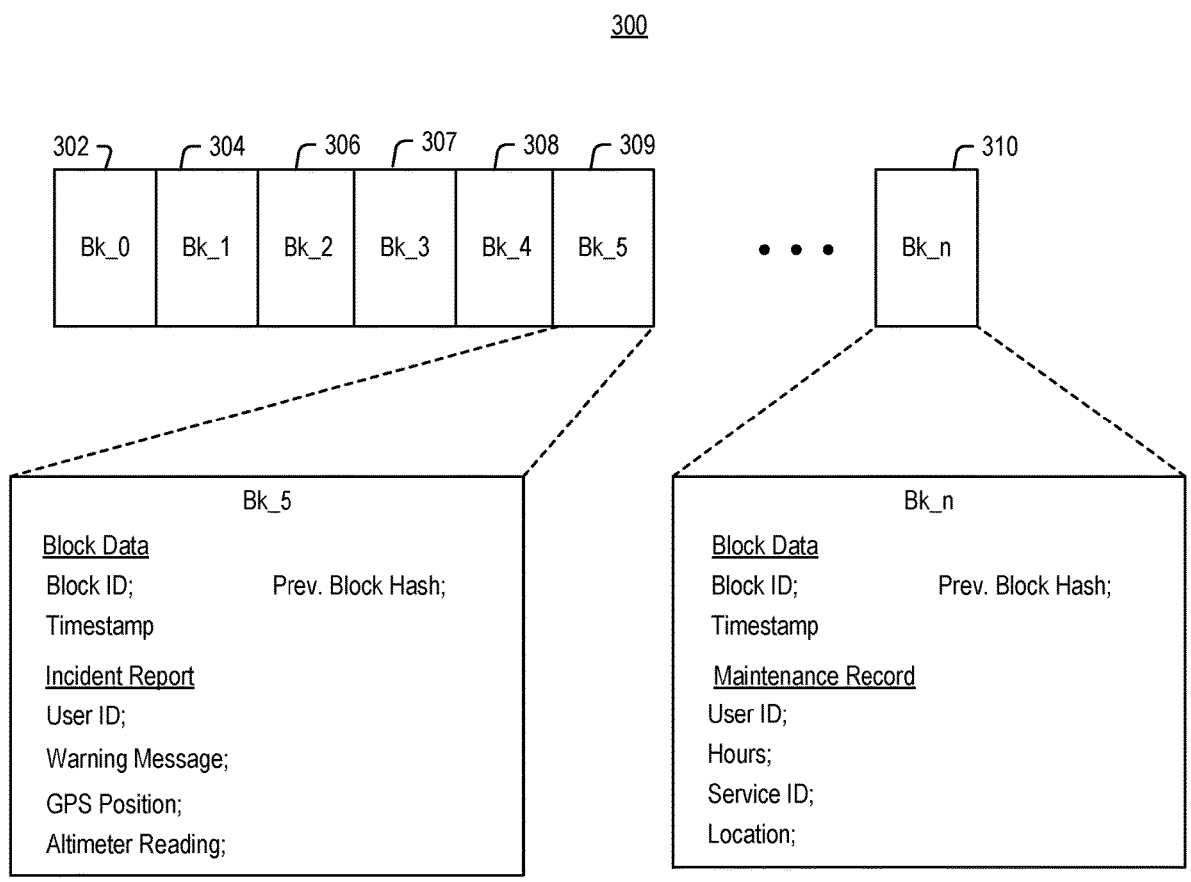
FIG. 3C is an additional view of the blockchain of FIG. 3A.

The blockchain data structure may include, among other things, account information, route information associated with the UAV (102), the telemetry data (107), the control instructions (130), the deconfliction instructions (139), and the route instructions (148). For example, the route information (110) may be used to generate blocks of the blockchain data structure (156). A sample blockchain data structure (300) is illustrated in FIGS. 3A-3C. Each block of the blockchain data structure (300) includes block data and other data, such as availability data, route data, telemetry data, service information, incident reports, etc.

The block data of each block includes information that identifies the block (e.g., a block ID) and enables the devices of the system (100) to confirm the integrity of the blockchain data structure (300). For example, the block data also includes a timestamp and a previous block hash. The timestamp indicates a time that the block was created. The block ID may include or correspond to a result of a hash function (e.g., a SHA256 hash function, a RIPEMD hash function, etc.) based on the other information (e.g., the availability data or the route data) in the block and the previous block hash (e.g., the block ID of the previous block). For example, in FIG. 3A, the blockchain data structure (300) includes an initial block (Bk_0) (302) and several subsequent blocks, including a block Bk_1 (304), a block Bk_2 (306), a block BK_3 (307), a block BK_4 (308), a block BK_5 (309), and a block Bk_n (310). The initial block Bk_0 (302) includes an initial set of availability data or route data, a timestamp, and a hash value (e.g., a block ID) based on the initial set of availability data or route data. As shown in FIG. 1, the block Bk_1 (304) also may include a hash value based on the other data of the block Bk_1 (304) and the previous hash value from the initial block Bk_0 (302). Similarly, the block Bk_2 (306) other data and a hash value based on the other data of the block Bk_2 (306) and the previous hash value from the block Bk_1 (304). The block Bk_n (310) includes other data and a hash value based on the other data of the block Bk_n (310) and the hash value from the immediately prior block (e.g., a block Bk_n–1). This chained arrangement of hash values enables each block to be validated with respect to the entire blockchain; thus, tampering with or modifying values in any block of the blockchain is evident by calculating and verifying the hash value of the final block in the block chain. Accordingly, the blockchain acts as a tamper-evident public ledger of availability data and route data for the system (100).

In addition to the block data, each block of the blockchain data structure (300) includes some information associated with a UAV (e.g., availability data, route information, telemetry data, incident reports, updated route information, maintenance records, etc.). For example, the block Bk_1 (304) includes availability data that includes a user ID (e.g., an identifier of the mobile device, or the pilot, that generated the availability data), a zone (e.g., a zone at which the pilot will be available), and an availability time (e.g., a time period the pilot is available at the zone to pilot a UAV). As another example, the block Bk_2 (306) includes route information that includes a UAV ID, a start point, an end point, waypoints, GPS coordinates, zone markings, time periods, primary pilot assignments, and backup pilot assignments for each zone associated with the route.

In the example of FIG. 3B, the block BK_3 (307) includes telemetry data, such as a user ID (e.g., an identifier of the UAV that generated the telemetry data), a battery level of the UAV; a GPS position of the UAV; and an altimeter reading. As explained in FIG. 1, a UAV may include many types of information within the telemetry data that is transmitted to the blockchain managers of the computers within the distributed computing network (151). In a particular embodiment, the UAV is configured to periodically broadcast to the network (118), a transaction message that includes the UAV's current telemetry data. The blockchain managers of the distributed computing network receive the transaction message containing the telemetry data and store the telemetry data within the blockchain (156).

FIG. 3B also depicts the block BK_4 (308) as including updated route information having a start point, an endpoint, and a plurality of zone times and backups, along with a UAV ID. In a particular embodiment, the control device (120) or the server (140) may determine that the route of the UAV should be changed. For example, the control device or the server may detect that the route of the UAV conflicts with a route of another UAV or a developing weather pattern. As another example, the control device or the server many determine that the priority level or concerns of the user have changed and thus the route needs to be changed. In such instances, the control device or the server may transmit to the UAV, updated route information, control data, or navigation information. Transmitting the updated route information, control data, or navigation information to the UAV may include broadcasting a transaction message that includes the updated route information, control data, or navigation information to the network (118). The blockchain manager (155) in the distributed computing network (151), retrieves the transaction message from the network (118) and stores the information within the transaction message in the blockchain (156).

FIG. 3C depicts the block BK_5 (309) as including data describing an incident report. In the example of FIG. 3C, the incident report includes a user ID; a warning message; a GPS position; and an altimeter reading. In a particular embodiment, a UAV may transmit a transaction message that includes an incident report in response to the UAV experiencing an incident. For example, if during a flight mission, one of the UAV's propellers failed, a warning message describing the problem may be generated and transmitted as a transaction message.

FIG. 3C also depicts the block BK_n (310) that includes a maintenance record having a user ID of the service provider that serviced the UAV; flight hours that the UAV had flown when the service was performed; the service ID that indicates the type of service that was performed; and the location that the service was performed. UAV must be serviced periodically. When the UAV is serviced, the service provider may broadcast to the blockchain managers in the distributed computing network, a transaction message that includes service information, such as a maintenance record. Blockchain managers may receive the messages that include the maintenance record and store the information in the blockchain data structure. By storing the maintenance record in the blockchain data structure, a digital and immutable record or logbook of the UAV may be created. This type of record or logbook may be particularly useful to a regulatory agency and an owner/operator of the UAV.

Referring back to FIG. 1, in a particular embodiment, the server (140) includes software that is configured to receive telemetry information from an airborne UAV and track the UAV's progress and status. The server (140) is also configured to transmit in-flight commands to the UAV. Operation of the control device and the server may be carried out by some combination of a human operator and autonomous software (e.g., artificial intelligence (AI) software that is able to perform some or all of the operational functions of a typical human operator pilot).

In a particular embodiment, the route instructions (148) cause the server (140) to plan a flight path, generate route information, dynamically reroute the flight path and update the route information based on data aggregated from a plurality of data servers. For example, the server (140) may receive air traffic data (167) over the network (119) from the air traffic data server (160), weather data (177) from the weather data server (170), regulatory data (187) from the regulatory data server (180), and topographical data (197) from the topographic data server (190). It will be recognized by those of skill in the art that other data servers useful in-flight path planning of a UAV may also provide data to the server (140) over the network (101) or through direct communication with the server (140).

The air traffic data server (160) may include a processor (162), memory (164), and communication circuitry (168). The memory (164) of the air traffic data server (160) may include operating instructions (166) that when executed by the processor (162) cause the processor to provide the air traffic data (167) about the flight paths of other aircraft in a region, including those of other UAVs. The air traffic data may also include real-time radar data indicating the positions of other aircraft, including other UAVs, in the immediate vicinity or in the flight path of a particular UAV. Air traffic data servers may be, for example, radar stations, airport air traffic control systems, the FAA, UAV control systems, and so on.

The weather data server (170) may include a processor (172), memory (174), and communication circuitry (178). The memory (174) of the weather data server (170) may include operating instructions (176) that when executed by the processor (172) cause the processor to provide the weather data (177) that indicates information about atmospheric conditions along the UAV's flight path, such as temperature, wind, precipitation, lightening, humidity, atmospheric pressure, and so on. Weather data servers may be, for example, the National Weather Service (NWS), the National Oceanic and Atmospheric Administration (NOAA), local meteorologists, radar stations, other aircraft, and so on.

The regulatory data server (180) may include a processor (182), memory (184), and communication circuitry (188). The memory (184) of the weather data server (180) may include operating instructions (186) that when executed by the processor (182) cause the processor provide the regulatory data (187) that indicates information about laws and regulations governing a particular region of airspace, such as airspace restrictions, municipal and state laws and regulations, permanent and temporary no-fly zones, and so on. Regulatory data servers may include, for example, the FAA, state and local governments, the Department of Defense, and so on.

The topographical data server (190) may include a processor (192), memory (194), and communication circuitry (198). The memory (194) of the topographical data server (190) may include operating instructions (196) that when executed by the processor (192) cause the processor to provide the topographical data that indicates information about terrain, places, structures, transportation, boundaries, hydrography, orthoimagery, land cover, elevation, and so on. Topographic data may be embodied in, for example, digital elevation model data, digital line graphs, and digital raster graphics. Topographic data servers may include, for example, the United States Geological Survey or other geographic information systems (GISs).

In some embodiments, the server (140) may aggregate data from the data servers (160, 170, 180, 190) using application program interfaces (APIs), syndicated feeds and eXtensible Markup Language (XML), natural language processing, JavaScript Object Notation (JSON) servers, or combinations thereof. Updated data may be pushed to the server (140) or may be pulled on-demand by the server (140). Notably, the FAA may be an important data server for both airspace data concerning flight paths and congestion as well as an important data server for regulatory data such as permanent and temporary airspace restrictions. For example, the FAA provides the Aeronautical Data Delivery Service (ADDS), the Aeronautical Product Release API (APRA), System Wide Information Management (SWIM), Special Use Airspace information, and Temporary Flight Restrictions (TFR) information, among other data. The National Weather Service (NWS) API allows access to forecasts, alerts, and observations, along with other weather data. The USGS Seamless Server provides geospatial data layers regarding places, structures, transportation, boundaries, hydrography, orthoimagery, land cover, and elevation. Readers of skill in the art will appreciate that various governmental and non-governmental entities may act as data servers and provide access to that data using APIs, JSON, XML, and other data formats.

Readers of skill in the art will realize that the server (140) can communicate with a UAV (102) using a variety of methods. For example, the UAV (102) may transmit and receive data using Cellular, 5G, Sub1 GHz, SigFox, WiFi networks, or any other communication means that would occur to one of skill in the art.

The network (119) may comprise one or more Local Area Networks (LANs), Wide Area Networks (WANs), cellular networks, satellite networks, internets, intranets, or other networks and combinations thereof. The network (119) may comprise one or more wired connections, wireless connections, or combinations thereof.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), and others as will occur to those of skill in the art. Various embodiments of the present invention may be implemented on a variety of hardware platforms in addition to those illustrated in FIG. 1.

Figure 2:
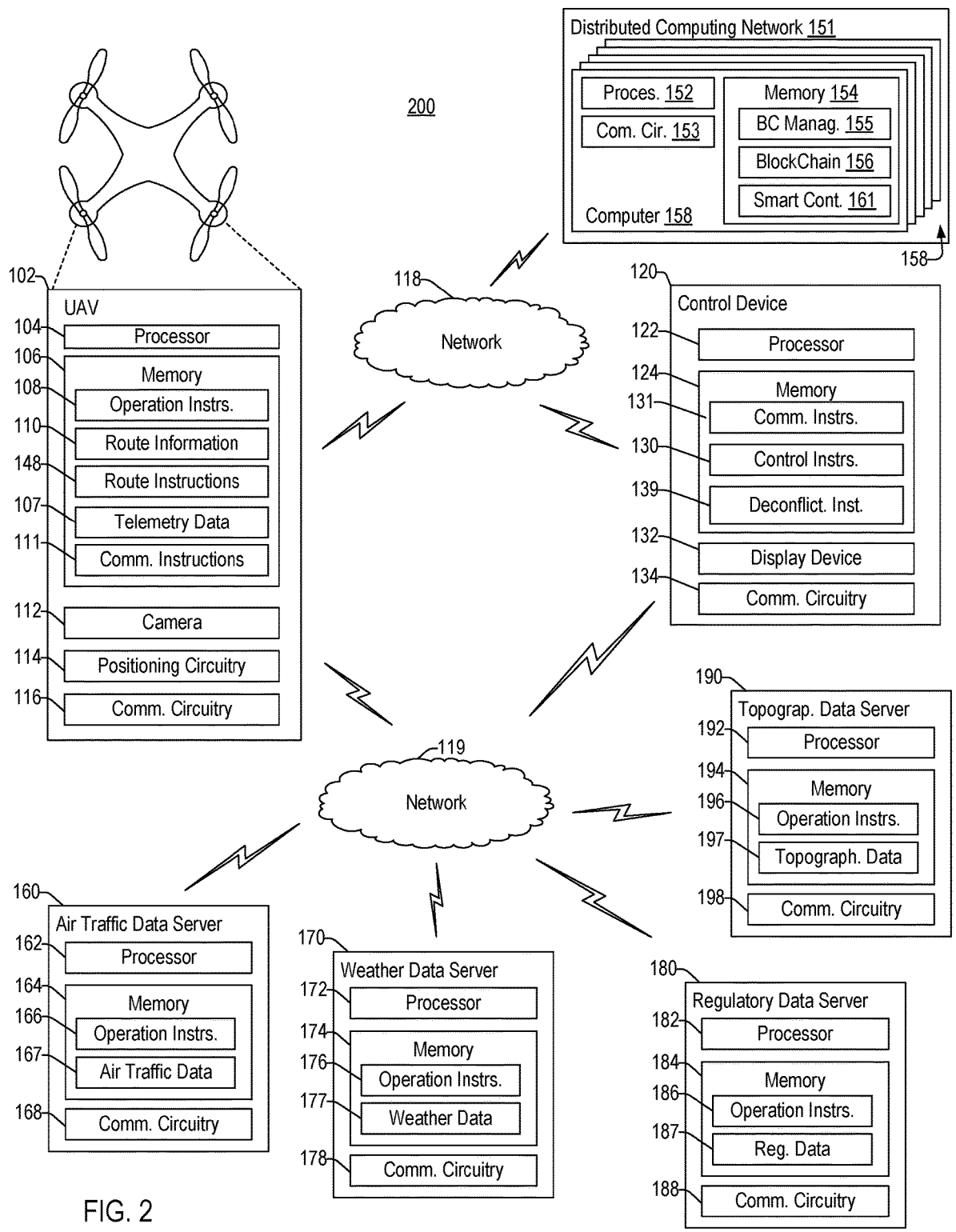
FIG. 2 is a block diagram illustrating another implementation of a system for blockchain-based hybrid authentication.

For further explanation, FIG. 2 sets forth a block diagram illustrating another implementation of a system (200) for accessing data associated with an unmanned aerial vehicle. Specifically, the system (200) of FIG. 2 shows an alternative configuration in which one or both of the UAV (102) and the server (140) may include route instructions (148) for generating route information. In this example, instead of relying on a server (140) to generate the route information, the UAV (102) and the control device (120) may retrieve and aggregate the information from the various data sources (e.g., the air traffic data server (160), the weather data server (170), the regulatory data server (180), and the topographical data server (190)). As explained in FIG. 1, the route instructions may be configured to use the aggregated information from the various source to plan and select a flight path for the UAV (102).

Figure 4:
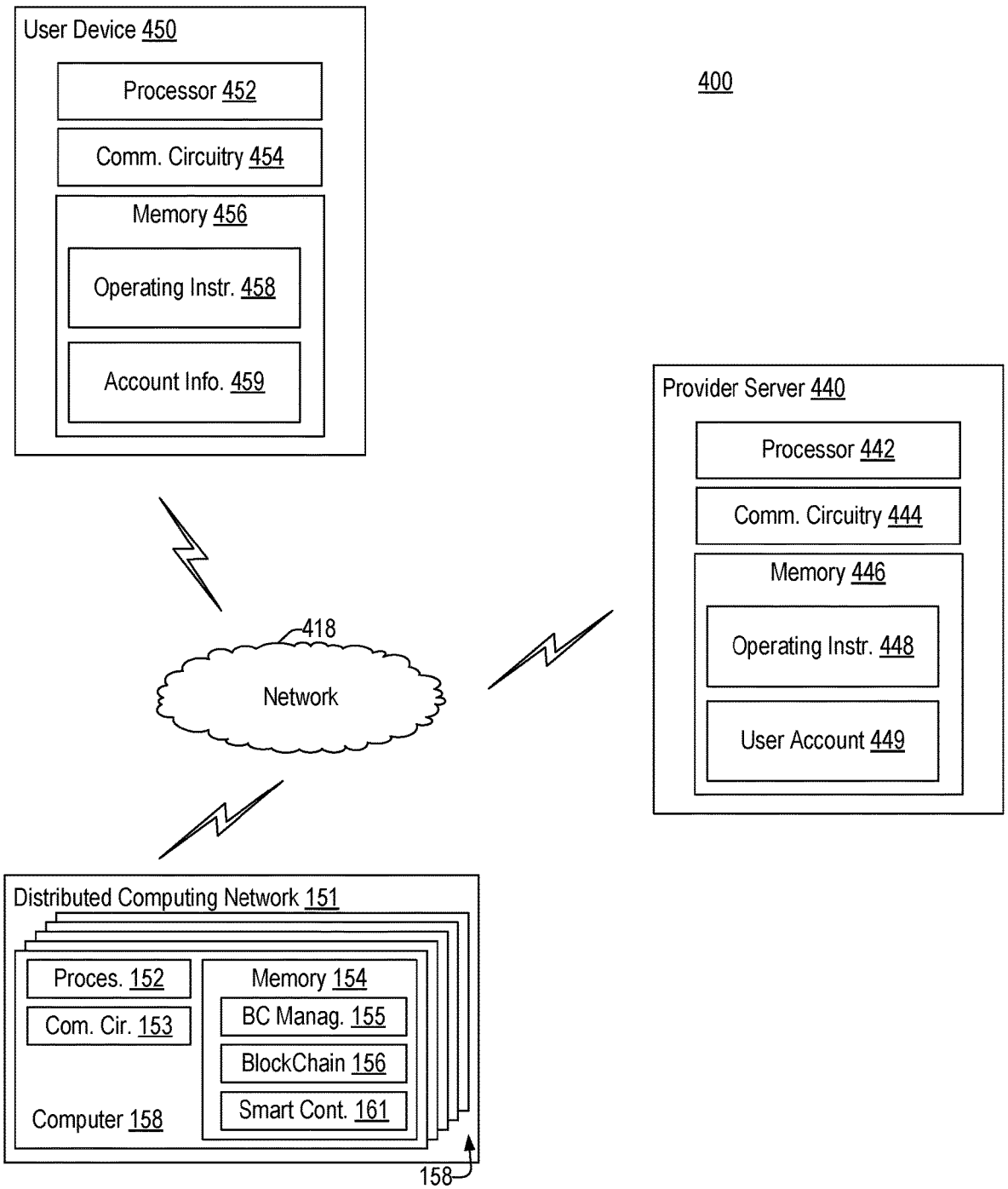
FIG. 4 is a block diagram illustrating a particular implementation of a system for blockchain-based hybrid authentication.

FIG. 4 is a block diagram illustrating a particular implementation of a system (400) for blockchain-based hybrid authentication. The system (400) includes the distributed computing network (151) of FIGS. 1-2, a client user device (450), and a provider server (440) coupled for communication to a network (418). In some embodiments, the provider server (440) may be any server that creates accounts for and authenticates information from a user of the user device (450) before providing account access from the user device (450). In a particular embodiment, the provider server (440) may be integrated with a server such as the server (140) of FIG. 1 and the user device (450) may be a control device such as the control device (120) of FIG. 1.

The provider server (440) includes a processor (442) coupled to communication circuitry (444) and a memory (446). The memory (446) includes operating instructions (448) which are configured to create a user account (449) and verify authentication information associated with the account (449). For example, the provider server (440) may receive a request to create a new account (449), receive a request to recover the account (449), request and receive user-provided authentication information for access to the user account (449), provide the user device (450) with a state token for access to the account (449). When the user device (450) generates a public/private key pair, either upon creation of a new account or in attempt to recover an existing account, the provider server (440) associates the public key of the client device (450) with the user account (449). The provider server (440) may additionally broadcast a transaction message that includes events for the account (449) to the distributed computing network. The transaction message may include events such as receiving a request to create the new account (449), receiving a request to recover the account (449), requesting and receiving user-provided authentication information for access to the user account (449), and providing the user device (450) with access to the account (449). The blockchain managers of the distributed computing network may create a block that includes the event information and store the block in a blockchain (156) associated with the user account (449).

The client user device (450) includes a processor (452) coupled to communication circuitry (454) and a memory (456). The memory (456) includes operating instructions (458) that when executed by the processor (458) cause the processor to, inter alia, generate client account information (459) such as a request to create a new account (449), a request to recover the account (449), authentication information for access to the user account (449), and to generate a public/private key pair for the account (449). The client account information (459) may be received by the provider server (440) and may be encapsulated in a transaction message that is received by the blockchain managers of the distributed computing network, which may create a block that includes the client account information (459) and store the block in a blockchain (156) associated with the user account (449).

In a particular embodiment, the user device (450) initiates a new account with the provider server (440) or requests to recover an existing account (e.g., due to a lost password), thus necessitating the user device (450) to generate a new public/private key pair. The user device (450) provides, or makes available, the public key of the public/private key pair to the provider server (440), and the user device uses the private key to authenticate a session with the provider server (440). To verify the identity of the user and thus associate the new key pair with the user account (449), the user device (450) invokes a smart contract signed by the user stored in a blockchain data structure (156) associated with the user. The user provides identification data in fulfillment of the smart contract, for example, by accessing the blockchain data structure (156) associated with the user with the private key for the blockchain data structure. When the smart contract is fulfilled, the server (440), being a party to the smart contract, allows the user to associate the user account (449) with the new public/private key pair.

In another particular embodiment, the user device (450) confirms the user identity with the server (440) with blockchain attestation. The user device (450) may provide a plaintext code word to the server (440) with an indication that the user will verify code word via the blockchain (156) associated with the user. The user device (450) creates an attestation event on the blockchain (156) with a hash of the code word, and an event listener on the server (440) detects the attestation event on the blockchain (156) and receives a hash of the code word. For example, the user device (450) may provide an updated phone number to the server (440) and also provide the updated phone number in an attestation event via the blockchain. Upon verifying the code word with the blockchain attestation, the server (440) may take an action in reliance upon the verification, for example, providing the user device (450) with a state token for the session or updating account information.

Figure 5:
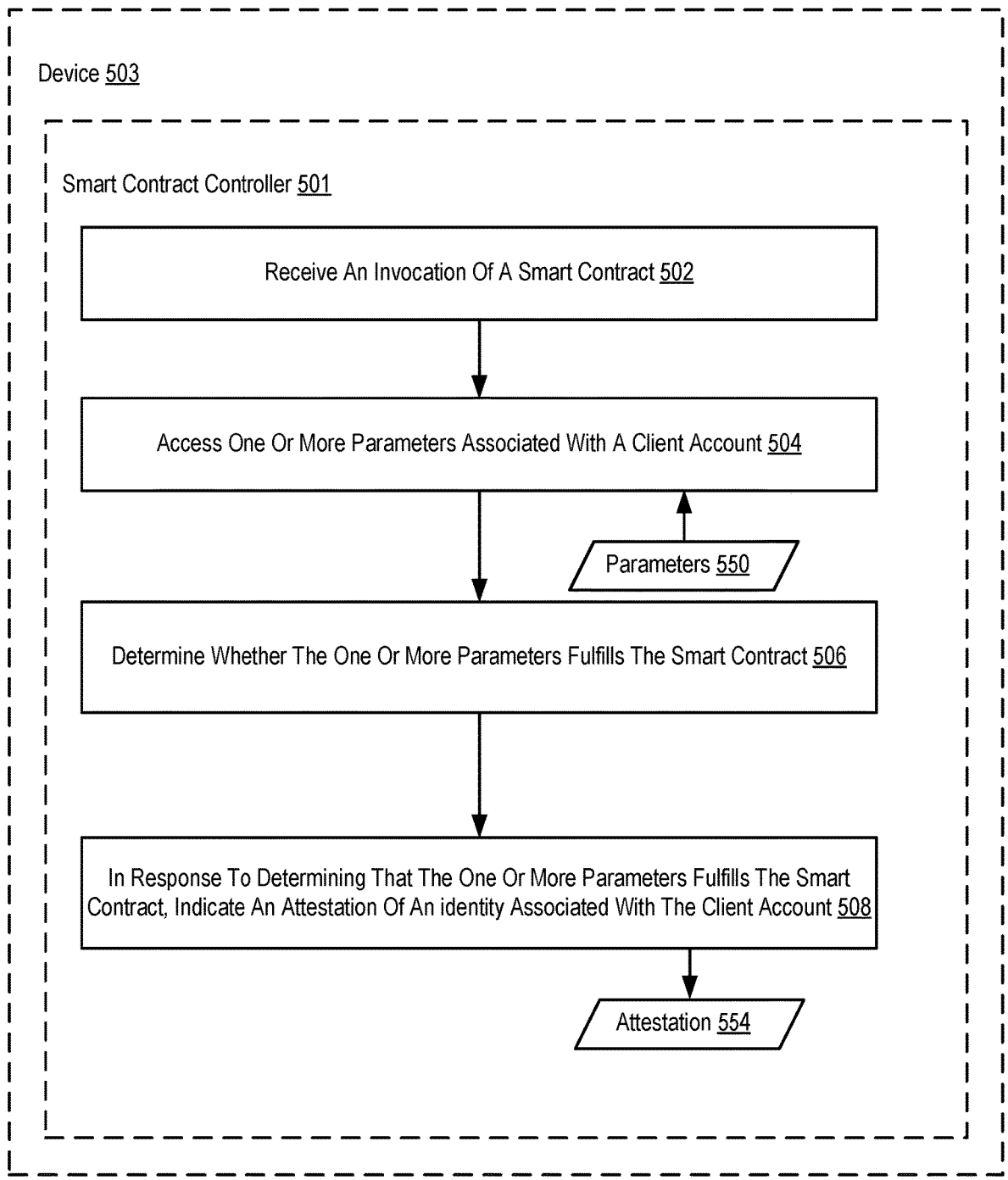
FIG. 5 is a flowchart to illustrate a particular implementation of a method for blockchain-based hybrid authentication.

For further explanation, FIG. 5 sets forth a flow chart illustrating an exemplary method for blockchain-based hybrid authentication. The method of FIG. 5 includes receiving (502), by a smart contract controller, an invocation of a smart contract. Receiving, by a smart contract controller, an invocation of a smart contract may be carried out by a smart contract controller (501) of a device (503) receiving a request to invoke a smart contract associated with a user account (e.g., account (449) of FIG. 4). The device (503) may correspond to a variety of devices, including but not limited to the devices in the system (400) of FIG. 4, devices of a UAV transportation ecosystem of FIG. 1, and/or computers (e.g., the computers (158) of FIG. 1) of a distributed computing network (e.g., the distributed computing network (151) of FIG. 1). The smart contract controller (501) is a series of computer program instructions that are executable by a processor to facilitate performance of a smart contract. A smart contract is a computerized transaction protocol that defines one or more conditions and specifies the operations that are performed in response to one or more parameters satisfying the one or more conditions. For example, a user and a service provider may agree to a smart contract that dictates the conditions for creating, modifying, or verifying account information. The user of the user device (450) can invoke the smart contract in creating an account (449) with the provider server (440) (see FIG. 4), in modifying an authentication method associated with the account (e.g., key pair association), and/or to provide additional or continual identity verification.

The method of FIG. 5 also includes accessing (504), by the smart contract controller, one or more parameters associated with a client account. Accessing (504), by the smart contract controller, one or more parameters associated with a client account may be carried out but the smart contract controller (501) acquiring data indicating the one or more parameters (550) associated with the client account. Parameters associated with a client account may define, represent, or identify information associated with a particular user and that user's account. Examples of parameters associated with a client account may include but are not limited to user information such as a user's name, address, social security number, driver's license information, etc.; account information such as account username, account number, identify verification questions and answers, etc.; and user device information such as tokens, certificates, IP address, etc. Readers of skill in the art that a variety of data associated with a client account may be used for identification, verification, and authentication. The smart contract controller (501) may access this data by receiving the data from one or more devices, for example, the user device (450) or the provider server (440) of FIG. 4. In another example, the smart contract controller is executing on a device that has direct access to the data that indicates the one or more parameters associated with the client account. For example, the smart contract controller may execute on a computer that also stores a copy of the blockchain data structure associated with the user or account that is the subject of the smart contract being facilitated by the smart contract controller.

The method of FIG. 5 also includes determining (506), by the smart contract controller (501), whether the one or more parameters fulfills the smart contract. In a smart contract, a condition may specify what action, event, or value must happen for another action or event to happen. According to embodiments of the present disclosure, the smart contract may specify the conditions for allowing users to authenticate themselves and make modifications to associations between a client account and user authentication and identification information. For example, a smart contract between a particular user and a service provider may require that the user verify a social security number, mother's maiden name, and year of high school graduation to allow the service provider to take a particular action with respect to their account (e.g., associate a new public key with the account); meanwhile a smart contract between a different user and that same service provider may require that the user verify a driver's license number, a birth date, and an answer to one or more preselected security questions to allow the service provider to take the same type of action. Thus, each user may agree to a specific set of conditions and data required to take a particular action with respect to that user's account with the service provider. Determining (506), by the smart contract controller (501), whether the one or more parameters (550) fulfills the smart contract may be carried by the smart contract controller (501) comparing values of a parameter (550) with a predetermined value for that parameter defined in the smart contract For example, if the answer to a security question is required to reset the account, the smart contract may specify the question and the answer to the question and compare the parameter to the answer.

In addition, the method of FIG. 5 also includes in response to determining that the one or more parameters fulfill the smart contract, indicating (508) an attestation of an identity associated with the client account. Indicating (508) an attestation of an identity associated with the client account may be carried out by generating or creating an attestation (554) such as an event, alert, data value, or message to represent that the user has successfully satisfied the conditions for fulfillment of the smart contract. For example, the smart contract controller (501) may transmit a transaction message to other devices (e.g., the server (120) of FIG. 1 or the server (440) of FIG. 4), or store the message in the blockchain data structure (156) associated with the client account (449). In this example, storing in the blockchain data structure provides a tamperproof record that the smart contract was fulfilled. For example, a provider server may rely on the attestation from the smart contract controller (501) that the user identity is verified before allowing the user to modify the account (449).

Figure 6:
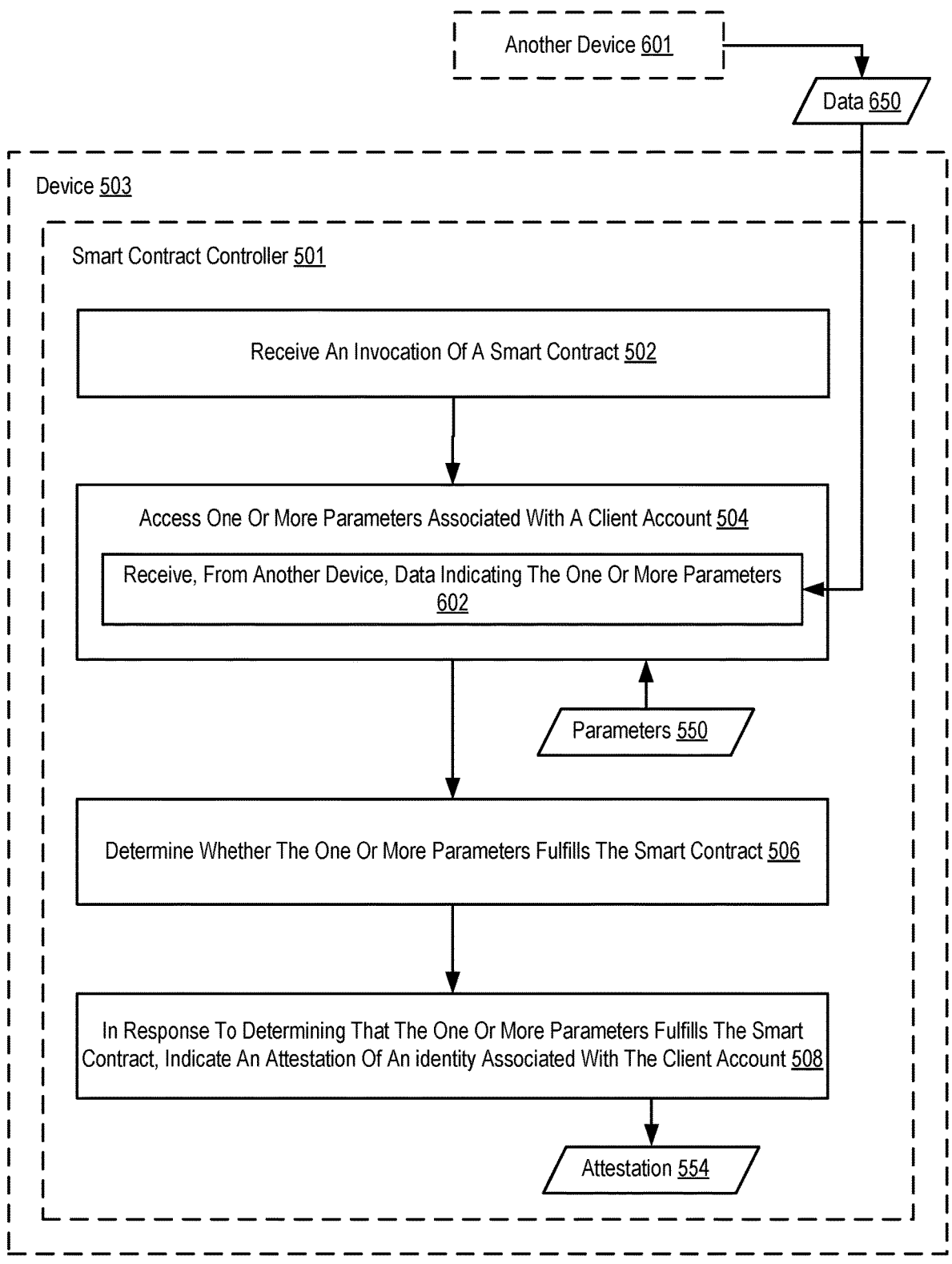
FIG. 6 is a flowchart to illustrate another implementation of a method for blockchain-based hybrid authentication.

For further explanation, FIG. 6 sets forth a flow chart illustrating an exemplary method for blockchain-based hybrid authentication, according to embodiments of the present disclosure. Like the exemplary method of FIG. 5, the exemplary method of FIG. 6 also includes receiving (502), by a smart contract controller, an invocation of a smart contract; accessing (504), by the smart contract controller, one or more parameters associated with a client account; determining (506), by the smart contract controller (501), whether the one or more parameters fulfills the smart contract; and in response to determining that the one or more parameters fulfill the smart contract, indicating (508) an attestation of an identity associated with the client account.

The exemplary method of FIG. 6 differs from the method of FIG. 5 in that in the method of FIG. 6, accessing (504), by the smart contract controller, one or more parameters associated with a client account includes receiving (602), from another device, data indicating the one or more parameters. Receiving (602), from another device, data indicating the one or more parameters may be carried out by the smart contract controller (501) transmitting a request for data indicating the one or more parameters, and receiving, in response to the request, the data (650) indicating the one or more parameters (550) from another device (601). For example, the smart contract controller may be executing on a device that does not have access to the blockchain data structure. In this example, the smart contract controller may identify another device (e.g., the server (440), the user device (450), or one of the computers of the distributed computing network (151) of FIG. 4) that possibly has access to the data indicating the one or more parameters, request the data, and receive the data from the other device.

Figure 7:
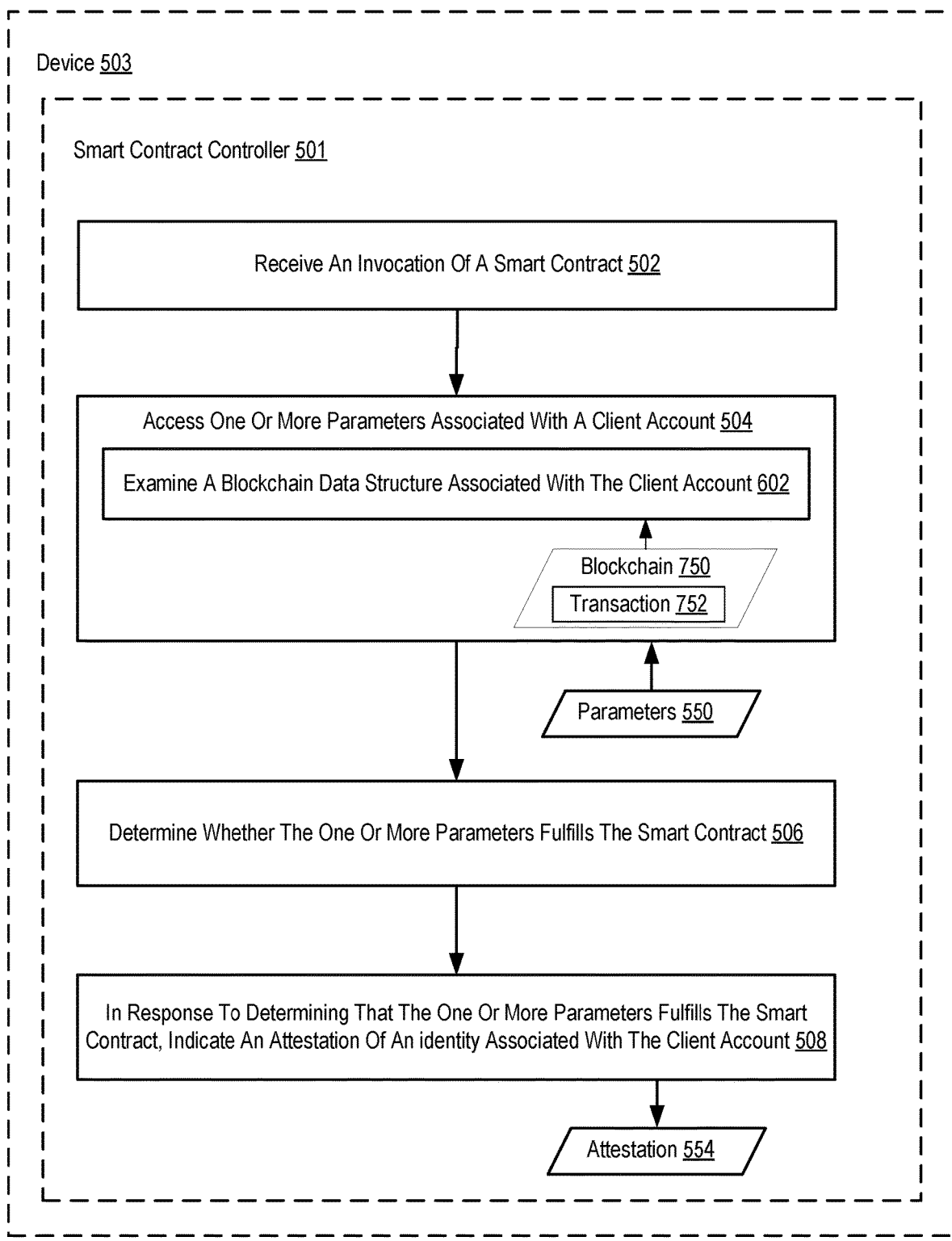
FIG. 7 is a flowchart to illustrate yet another implementation of a method for blockchain-based hybrid authentication.

For further explanation, FIG. 7 sets forth a flow chart illustrating an exemplary method for blockchain-based hybrid authentication, according to embodiments of the present disclosure. Like the exemplary method of FIG. 5, the exemplary method of FIG. 7 also includes receiving (502), by a smart contract controller, an invocation of a smart contract; accessing (504), by the smart contract controller, one or more parameters associated with a client account; determining (506), by the smart contract controller (501), whether the one or more parameters fulfills the smart contract; and in response to determining that the one or more parameters fulfill the smart contract, indicating (508) an attestation of an identity associated with the client account.

The exemplary method of FIG. 7 differs from the method of FIG. 5 in that in the method of FIG. 7, accessing (504), by the smart contract controller, one or more parameters associated with a client account includes examining (702) one or more transactions (752) on a blockchain data structure (750) associated with the client account. In the example of FIG. 7, the one or more transactions (752) indicate the one or more parameters (550). Examining (702) one or more transactions (752) on a blockchain data structure (750) associated with the client account may be carried out by directly or indirectly searching the blockchain data structure for transactions that indicate the one or more parameters. For example, after invoking the smart contract to modify authentication information associated with the user's account, the user device (e.g., user device (450) of FIG. 4) may supply identification data as one or more parameters (550) supplied for fulfilling the smart contract. The identification data (e.g., a social security number, birth city, driver's license number, etc.) hashed and provided to the blockchain data structure (750) associated with the user. A smart contract controller may then use the hashed identify data parameters from the blockchain data structure to verify the identity data in determining whether the smart contract is fulfilled and/or blockchain data structure attests to the identity of the user. Further, the smart contract controller may indicate identity attestation to a relying party (e.g., the provider server (440) of FIG. 4).

Figure 8:
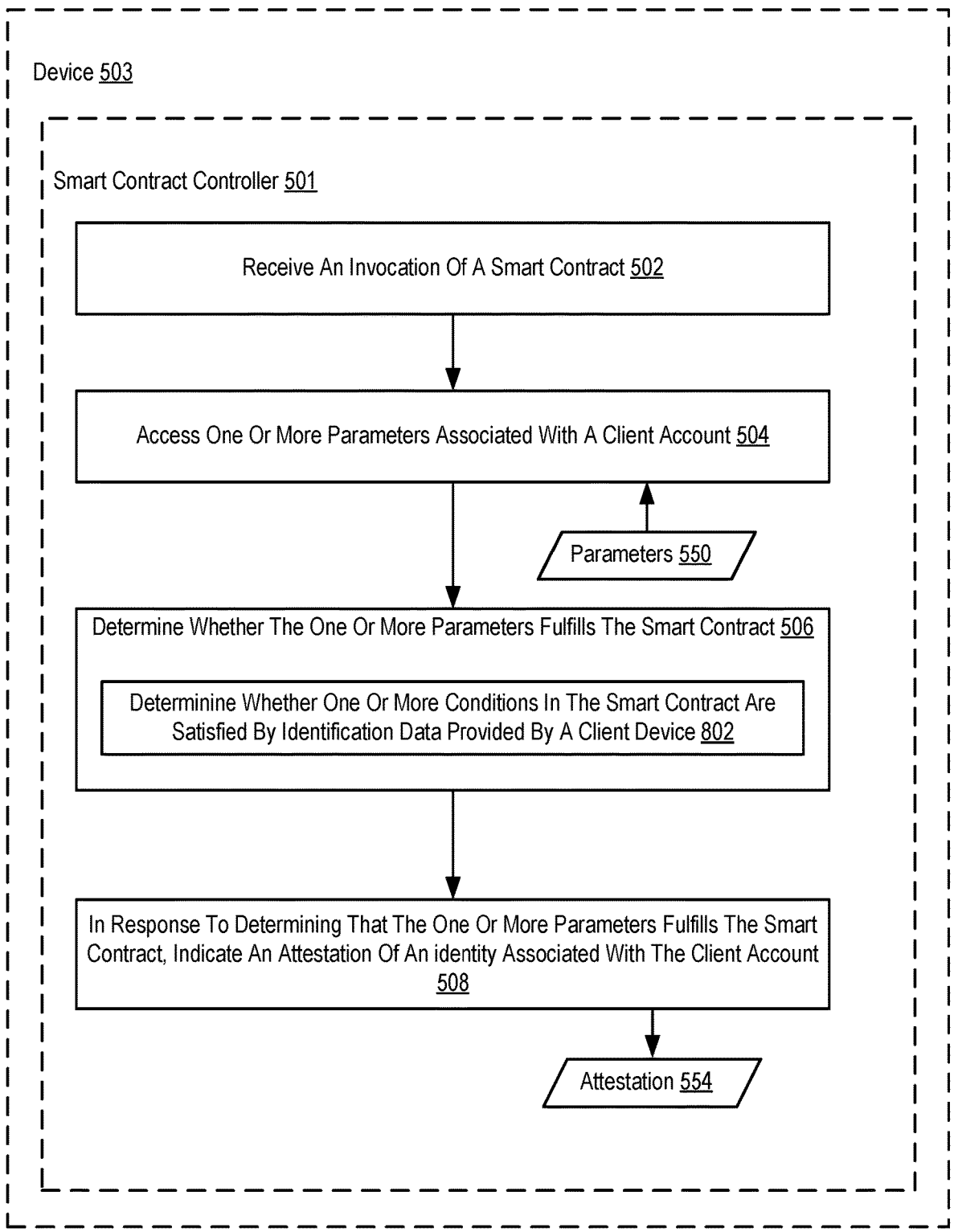
FIG. 8 is a flowchart to illustrate yet another implementation of a method for blockchain-based hybrid authentication.

For further explanation, FIG. 8 sets forth a flow chart illustrating an exemplary method for blockchain-based hybrid authentication, according to embodiments of the present disclosure. Like the exemplary method of FIG. 5, the exemplary method of FIG. 8 also includes receiving (502), by a smart contract controller, an invocation of a smart contract; accessing (504), by the smart contract controller, one or more parameters associated with a client account; determining (506), by the smart contract controller (501), whether the one or more parameters fulfills the smart contract; and in response to determining that the one or more parameters fulfill the smart contract, indicating (508) an attestation of an identity associated with the client account.

The exemplary method of FIG. 8 differs from the method of FIG. 5 in that in the method of FIG. 8, determining (506), by the smart contract controller (501), whether the one or more parameters fulfills the smart contract includes determining (802) whether one or more conditions in the smart contract are satisfied by identification data provided by a client device. The smart contract defines specific conditions that must be met before specific actions are permitted to be taken. For example, a smart contract may dictate that a set of identification conditions must be satisfied before authentication modifications may be made to a user's account (e.g., associating a new public/private key pair with the account). In this example, the user, via the client device, may provide values for identification data parameters (e.g., social security number, birth city, secret question/answer, driver's license number, etc.) and the smart contract controller determines whether a set of conditions are satisfied by comparing the values provided by the user to verified values. For example, the smart contract controller may obtain the verified values by examining the blockchain data structure or from other devices and data sources. As one example, with reference to FIG. 4, the client device may be the user device (450). The verified values may be provided in advance to or may be knowable by the provider server (440), and the smart contract controller (501) obtains the verified values from the provider server (440). As another example, the smart contract may expressly include the verified values as masked data.

Figure 9:
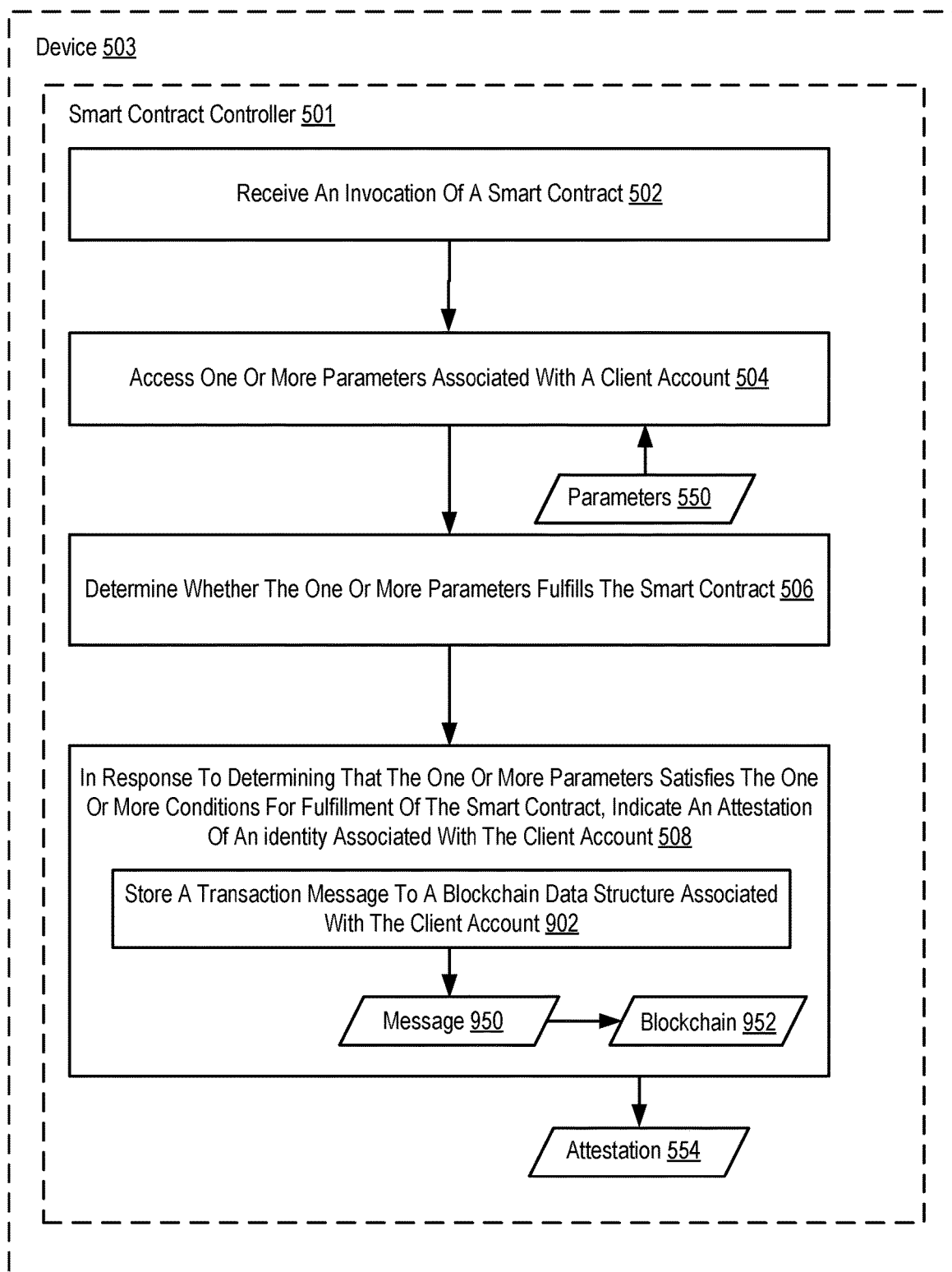
FIG. 9 is a flowchart to illustrate yet another implementation of a method for blockchain-based hybrid authentication.

For further explanation, FIG. 9 sets forth a flow chart illustrating an exemplary method for blockchain-based hybrid authentication, according to embodiments of the present disclosure. Like the exemplary method of FIG. 5, the exemplary method of FIG. 9 also includes receiving (502), by a smart contract controller, an invocation of a smart contract; accessing (504), by the smart contract controller, one or more parameters associated with a client account; determining (506), by the smart contract controller (501), whether the one or more parameters fulfills the smart contract; and in response to determining that the one or more parameters fulfill the smart contract, indicating (508) an attestation of an identity associated with the client account.

The exemplary method of FIG. 9 differs from the method of FIG. 5 in that in the method of FIG. 9, in response to determining that the one or more parameters fulfill the smart contract, indicating (508) an attestation of an identity associated with the client account storing a transaction message (950) to a blockchain data structure (952) associated with the client account. For example, the transaction message may include the indication of the attestation that the user has proved their identity by providing sufficient information to fulfill one more aspects of the smart contract. Storing (902) a transaction message (950) to a blockchain data structure (952) associated with the client account may be carried out by directly storing the transaction message as a block on the blockchain data structure. Alternatively, the smart contract controller may broadcast the message to another device that may store the transaction message on the blockchain data structure.

Figure 10:
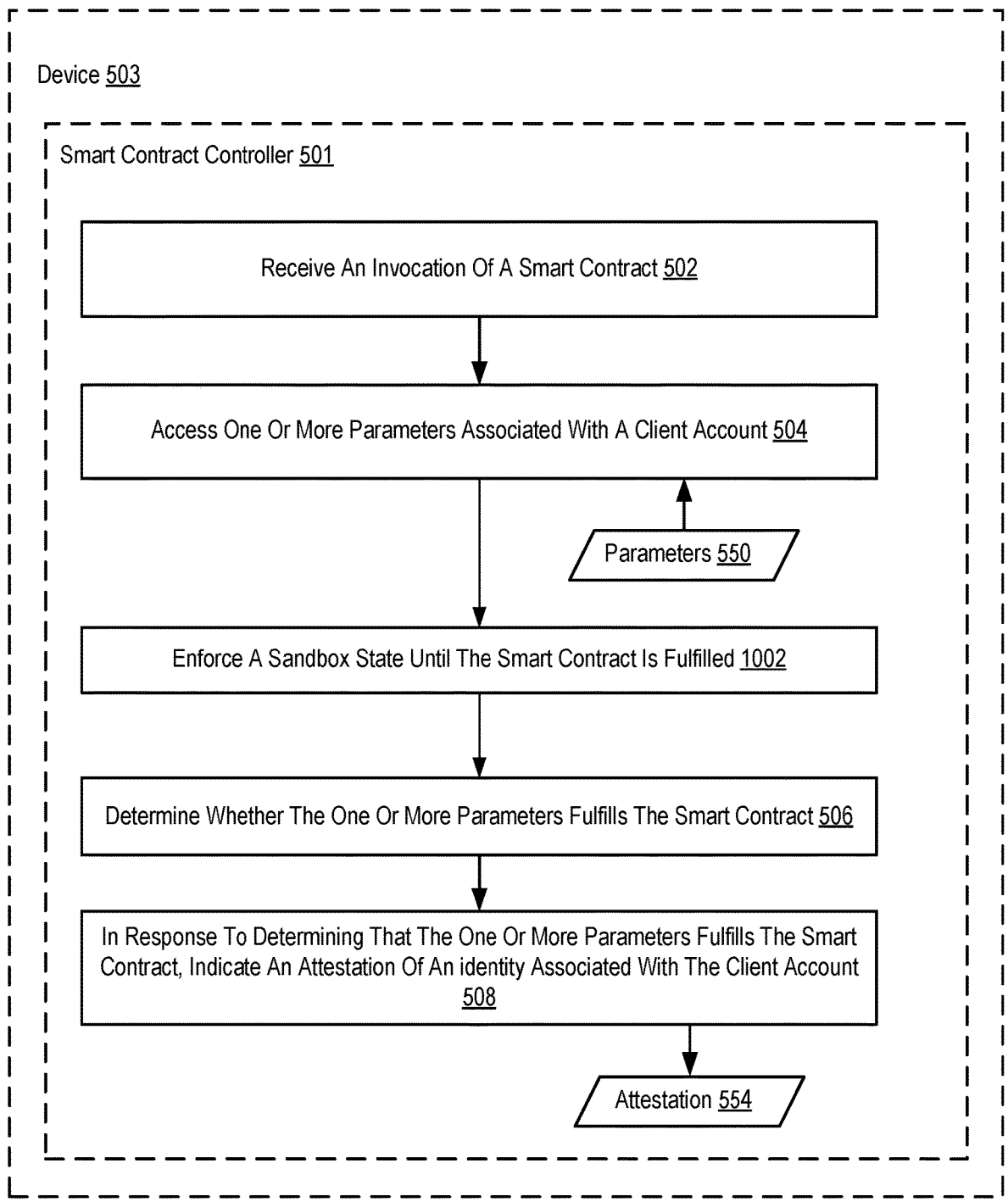
FIG. 10 is a flowchart to illustrate yet another implementation of a method for blockchain-based hybrid authentication.

For further explanation, FIG. 10 sets forth a flow chart illustrating an exemplary method for blockchain-based hybrid authentication, according to embodiments of the present disclosure. Like the exemplary method of FIG. 5, the exemplary method of FIG. 10 also includes receiving (502), by a smart contract controller, an invocation of a smart contract; accessing (504), by the smart contract controller, one or more parameters associated with a client account; determining (506), by the smart contract controller (501), whether the one or more parameters fulfills the smart contract; and in response to determining that the one or more parameters fulfill the smart contract, indicating (508) an attestation of an identity associated with the client account.

The exemplary method of FIG. 10 differs from the method of FIG. 5 in that in the method of FIG. 10 also includes enforcing (1002), by the smart contract controller (501), a sandbox state until the smart contract is fulfilled. Enforcing (1002), by the smart contract controller (501), a sandbox state until the smart contract is fulfilled may be carried out by using terms within the smart contract to identify the extent to which a user may access the account (e.g., the account (449) in FIG. 4). For example, the smart contract may specify a number of parameters and conditions that must be satisfied before the account is promoted to full functionality. Until predetermined data is supplied and predetermined conditions are satisfied in furtherance of the smart contract, the smart contract controller may, through permissions enforced using the blockchain data structure, limit what the user may do using their account. In a particular example, the user account may be an accounting within a UAV transportation ecosystem, and the user is attempting to associate their account with a new public/private key pair due to a lost password. In this example, the smart contract controller may limit the functionality of the account, for example, by prohibiting the user account from operating a UAV in the UAV transportation ecosystem. This sandbox state is maintained until the user has supplied parameters to fulfill the smart contract, to which the user is a signatory.

In view of the foregoing, readers of skill in the art will recognize that the benefits of blockchain-based hybrid authentication include, among others, improving security by allowing users to attest to their identity using blockchain, mitigating against data breaches by allowing users to be the only holder of their public private key pair, streamlining account recovery and key pair regeneration, and providing account providers with an auditable record of the condition under which a user account is accessed and modified. While aspects of this disclosure are described in the context of a UAV transportation ecosystem, this should not be construed as limiting as readers of skill in the art will recognized that blockchain-based hybrid authentication in accordance with the present invention may be implemented in a wide variety of contexts.

Exemplary embodiments of the present invention are described largely in the context of a fully functional computer system for blockchain-based hybrid authentication. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Hardware logic, including programmable logic for use with a programmable logic device (PLD) implementing all or part of the functionality previously described herein, may be designed using traditional manual methods or may be designed, captured, simulated, or documented electronically using various tools, such as Computer Aided Design (CAD) programs, a hardware description language (e.g., VHDL or Verilog), or a PLD programming language. Hardware logic may also be generated by a non-transitory computer readable medium storing instructions that, when executed by a processor, manage parameters of a semiconductor component, a cell, a library of components, or a library of cells in electronic design automation (EDA) software to generate a manufacturable design for an integrated circuit. In implementation, the various components described herein might be implemented as discrete components or the functions and features described can be shared in part or in total among one or more components. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of blockchain-based hybrid authentication, the method comprising:
   receiving, by a smart contract controller, an invocation of a smart contract to verify a user's authorization to access a client account in an unmanned aerial vehicle (UAV) transportation ecosystem;
   accessing, by the smart contract controller, one or more parameters associated with the client account;
   determining, by the smart contract controller, whether the one or more parameters fulfill the smart contract;
   until the smart contract is fulfilled, enforcing, by the smart contract controller, a sandbox state including limiting a functionality of the client account by prohibiting the client account from operating a UAV in the UAV transportation ecosystem; and
   in response to determining that the one or more parameters fulfill the smart contract, indicating an attestation of an identity associated with the client account.

2. The method of claim 1, wherein accessing, by the smart contract controller, one or more parameters associated with a client account includes receiving, from a client device, data indicating the one or more parameters.

3. The method of claim 1, wherein accessing, by the smart contract controller, one or more parameters associated with a client account includes examining a blockchain data structure associated with the client account.

4. The method of claim 1, wherein determining, by the smart contract controller, whether the one or more parameters fulfill the smart contract includes determining whether one or more conditions in the smart contract are satisfied by identification data provided by a client device.

5. The method of claim 1, wherein, in response to determining that the one or more parameters fulfill the smart contract, indicating an attestation of an identity associated with the client account includes storing a transaction message to a blockchain data structure associated with the client account.

6. The method of claim 1, wherein the smart contract states terms for associating a client's new public key of a public/private key pair with the client account.

7. An apparatus for blockchain-based hybrid authentication, the apparatus comprising:
   a processor; and
   a memory storing instructions, the instructions executable by the processor to:
   receive, by a smart contract controller, an invocation of a smart contract to verify a user's authorization to access a client account in an unmanned aerial vehicle (UAV) transportation ecosystem;
   access, by the smart contract controller, one or more parameters associated with the client account;
   determine, by the smart contract controller, whether the one or more parameters fulfill the smart contract;
   until the smart contract is fulfilled, enforcing, by the smart contract controller, a sandbox state including limiting a functionality of the client account by prohibiting the client account from operating a UAV in the UAV transportation ecosystem; and
   in response to determining that the one or more parameters fulfill the smart contract, indicate an attestation of an identity associated with the client account.

8. The apparatus of claim 7, wherein accessing, by the smart contract controller, one or more parameters associated with a client account includes receiving, from a client device, data indicating the one or more parameters.

9. The apparatus of claim 7, wherein accessing, by the smart contract controller, one or more parameters associated with a client account includes examining a blockchain data structure associated with the client account.

10. The apparatus of claim 7, wherein determining, by the smart contract controller, whether the one or more parameters fulfill the smart contract includes determining whether one or more conditions in the smart contract are satisfied by identification data provided by a client device.

11. The apparatus of claim 7, wherein, in response to determining that the one or more parameters fulfill the smart contract, indicating an attestation of an identity associated with the client account includes storing a transaction message to a blockchain data structure associated with the client account.

12. The apparatus of claim 7, wherein the smart contract states terms for associating a client's new public key of a public/private key pair with the client account.

13. A non-transitory computer-readable medium for blockchain-based hybrid authentication, the computer-readable medium storing instructions that, when executed by a processor, cause the processor to perform operations, the operations comprising:
receiving, by a smart contract controller, an invocation of a smart contract to verify a user's authorization to access a client account in an unmanned aerial vehicle (UAV) transportation ecosystem;
accessing, by the smart contract controller, one or more parameters associated with the client account;
determining, by the smart contract controller, whether the one or more parameters fulfill the smart contract;
until the smart contract is fulfilled, enforcing, by the smart contract controller, a sandbox state including limiting a functionality of the client account by prohibiting the client account from operating a UAV in the UAV transportation ecosystem; and
in response to determining that the one or more parameters fulfill the smart contract, indicating an attestation of an identity associated with the client account.

14. The computer-readable medium of claim 13, wherein accessing, by the smart contract controller, one or more parameters associated with a client account includes receiving, from a client device, data indicating the one or more parameters.

15. The computer-readable medium of claim 13, wherein accessing, by the smart contract controller, one or more parameters associated with a client account includes examining a blockchain data structure associated with the client account.

16. The computer-readable medium of claim 13, wherein determining, by the smart contract controller, whether the one or more parameters fulfill the smart contract includes determining whether one or more conditions in the smart contract are satisfied by identification data provided by a client device.

17. The computer-readable medium of claim 13, wherein, in response to determining that the one or more parameters fulfill the smart contract, indicating an attestation of an identity associated with the client account includes storing a transaction message to a blockchain data structure associated with the client account.

\* \* \* \* \*